Nov. 27, 1923. 1,475,350
D. H. MARVIN
AUTOMOBILE TRANSMISSION GEARING
Original Filed Feb. 9, 1921
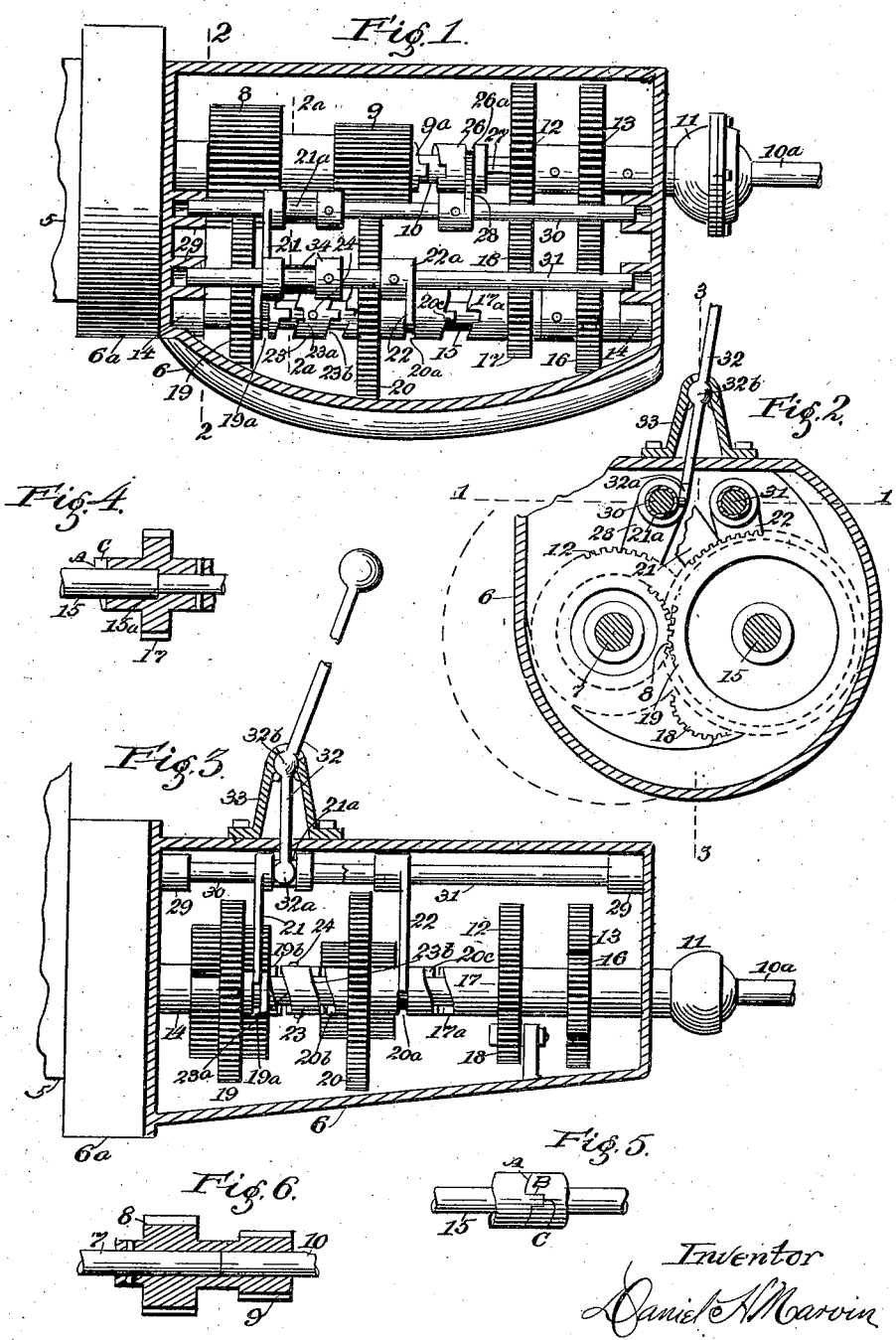

Patented Nov. 27, 1923.

1,475,350

UNITED STATES PATENT OFFICE.

DANIEL H. MARVIN, OF CEDAR RAPIDS, IOWA.

AUTOMOBILE TRANSMISSION GEARING.

Application filed February 9, 1921, Serial No. 443,584. Renewed October 8, 1923.

*To all whom it may concern:*

Be it known that I, DANIEL H. MARVIN, a citizen of the United States, residing at Cedar Rapids, in the county of Linn and State of Iowa, have invented certain new and useful Improvements in Automobile Transmission Gearing; and I do hereby declare the following to be a full, clear, and exact description of the invention such as will enable others skilled in the art to which it appertains to make and use the same.

This invention relates to the transmission gearing of automobiles and other motor vehicles, and the object of the invention is to provide a variable speed transmission device in which the various gears are always in mesh, and the shift from one speed to another is effected by means of clutches cooperating with said gears. The invention also involves the use of a novel type of clutch, adapted for easy engagement at any rate of speed, and with little clash or shock, and capable of holding the gearing in proper engagement against back-lash, as when the car is coasting with power from the engine disconnected.

In the accompanying drawing, forming a part of this specification, Fig. 1 is a plan view of mechanism embodying my invention, the gear-case being in section on the line 1—1 of Fig. 2. Fig. 2 is an end elevation of the same, as seen from the left of the section line 2—2, through the gear-case, and line $2^a$—$2^a$ through the shift-rods of Fig. 1. Fig. 3 is a side elevation of the same, as seen from the right of section line 3—3 of Fig. 2. Fig. 4 is a fragmentary view of the jack-shaft and a section of the reverse-gear mounted thereon. Fig. 5 is a fragmentary detail view showing one of the clutches as engaged. Fig. 6 is a sectional view, showing the power and transmission shafts and the double gears mounted thereon.

As above indicated, the transmission mechanism is designed primarily for use on motor vehicles, such as automobiles and trucks, and in the drawing the numeral 5 denotes a fragment of the motor (gasoline engine), to which in modern practice the transmission gear-case 6 is attached, the same commonly including a housing $6^a$ for the main friction clutch, not shown. It is of course to be understood that one member of this clutch is attached to the engine crankshaft, and the other to a short shaft 7, to which is rigidly secured the main driving gears 8 and 9, herein shown as integral. Loosely journaled in this driving-gear is the main transmission shaft 10, or, to be precise, that portion of the same which connects by a universal joint 11 with the inclined portion $10^a$ of the main shaft. To this mainshaft 10 is secured a pair of gears 12 and 13, the purpose of which will appear presently. At a suitable distance from the driving shaft and main shaft, is mounted in bearings 14 a jack-shaft 15. To this is secured a gear 16 meshing with the gear 13. Adjacent to the gear 16 is a smaller gear 17, revoluble on the shaft, and held to proper position by a shoulder $15^a$ of the shaft. This gear meshes with an idle gear 18, which in turn meshes with the gear 12, and thereby reverse motion is imparted to the main-shaft. Opposite the gears 8 and 9 are gears 19 and 20, respectively, mounted revolubly on the jack-shaft. These gears are also slidable on the jackshaft, and are provided with grooved hubs $19^a$ and $20^a$, to receive the forks 21 and 22 of the shifter, to be described presently. One end of the hub of 19 has a clutch-face $19^b$, and both ends of the hub of 20 have clutch faces $20^b$ and $20^c$, respectively. Between these hubs a clutch-collar 23, provided with faces $23^a$ and $23^b$ to engage adjacent gearhubs, is secured rigidly to the shaft, as by a pin 24. The end of the gear-hub $17^a$ has a clutch-face to engage the adjacent hub $20^c$. The gear 8—9 has a clutch-face $9^a$, and adjacent to this is mounted a slidable clutch-collar 26, engageable therewith, and held from turning on the shaft by a spline 27. This collar is grooved at $26^a$ to receive a fork 28 connecting with the shifting mechanism. In both Figs. 1 and 3 the parts are shown in the neutral position. Instead of the usual vertical disposition of the driving and jackshafts, they are herein shown disposed horizontally, with respect to each other, to permit a somewhat more convenient arrangement of the shifting mechanism, the gearcase being correspondingly extended laterally, as shown.

Above the gears, in bearings 29, is mounted a pair of slide-rods 30 and 31. The former carries the fork 28, and also a fork 21, above mentioned, the hub of which is grooved at $21^a$ to receive the engaging end $32^a$ of a shift-lever 32 mounted by a universal joint $32^b$ in a standard 33 at the top of the gear-case. On the adjacent slide-rod is secured a similarly grooved collar 34, and at the proper distance therefrom is secured the hub 22ª of the fork 22 above mentioned.

The device is arranged for what is known as the "standard shift", and its operation will be readily understood. When the shift-lever is thrown to the right and forwardly, the large gear 20 is slid rearwardly, and engages the small gear 17, imparting a slow reverse movement to the main-shaft for backing the car from the curb, or the like. When the lever is thrown straight forward from that position, the same large gear engages the clutch-collar 23, giving rotation to the jack-shaft, and with it the small gear 16, meshing with the main-shaft gear 13, and thus giving slow forward movement to the main-shaft. When the shift-lever is thrown to the left and forwardly an intermediate forward speed is imparted to the main-shaft by the engagement of the gear 19 with the same clutch-collar. Throwing the shift-lever back in the same line engages the clutch 26, which of course gives the main-shaft the same speed as the engine, the jack-shaft and its gears running idle, none of the gear-pairs being at any time out of mesh.

It will be evident that the transmission may be shifted to engagement for any speed at any time, without even releasing the main friction-clutch. This might of course cause the car to jump, and might sometimes stall the engine, but there would be none of that clashing and grinding of gear-teeth, and stripping of gears, which it is one of the main purposes of this invention to avoid.

In the formation of the clutches provision is made for easy and certain engagement, regardless of the speed of the moving parts, and for continued engagement when the speed of the main-shaft tends to exceed the speed of the driver, as in coasting, with the power of the engine cut off. It will be seen that for a part of their depth the clutch faces are inclined spirally at A, and a deeper, parallel-sided shoulder B is made to engage a corresponding seat C. It will be evident that when the shift-lever is operated to engage the clutches, the shoulder will either enter the seat at once, or will be led thereto by the spiral face of the female member of the clutch, pressure being applied to the lever until fully engaged. If now the vehicle be allowed coast down a hill, with power shut off, the accelerated motion of the main-shaft cannot disengage the clutch, the short side walls of the shoulder and seat holding as well as the longer opposite walls.

Having thus described my invention, I claim:

1. In a gear transmission, a driving shaft, a broad-faced gear secured thereto, a transmission shaft journaled therein, an adjacent clutch to engage said gear, a gear attached to the transmission shaft, a parallel jack-shaft, a gear secured thereto and meshing with the gear of the transmission shaft, a slidable gear meshing with the broad-faced gear, and revoluble on the jack-shaft, a clutch secured to the jack-shaft, and means for shifting said revoluble gear, and the clutch of the transmission shaft.

2. In transmission gearing, a driving shaft, plural gears of different sizes secured thereto, a main-shaft journaled therein, an adjacent clutch, one member of which is splined slidably on the main-shaft, a gear secured to the main-shaft, a parallel jack-shaft, a gear secured thereto and in mesh with the main-shaft gear, plural gears loosely and slidably mounted on the jack-shaft, and in mesh with the first named gears, a clutch-member secured to the jack-shaft between the loose gears thereon, which gears have engaging clutch-members, and means for independently shifting the splined clutch-member together with one of said loose gears, or the other loose gear at will.

3. A three-speed and reverse transmission for motor vehicles, comprising, with the driving shaft, a pair of broad-faced, differently sized gears secured to the shaft, a separate main-shaft aligned with the driving shaft, a clutch to engage the gears, a pair of gears attached to the main-shaft, a parallel jack-shaft, an attached gear in mesh with one of the main-shaft gears, an adjacent loose gear adapted for clutch engagement, an idle gear in mesh therewith and with the other main-shaft gear, an adjacent gear loose and slidable on the jack-shaft, and in mesh with one of the broad-faced gears, a clutch-member engageable with said gear and fixed to the shaft, an adjacent loose and slidable gear engaging the other broad-faced gear, and adapted for engagement with said fixed clutch-member, and means adapted to shift the last mentioned gear and the main-shaft clutch, and independent means for shifting the gear in mesh with the other broad-faced gear.

4. In transmission gearing, a shouldered jack-shaft, a gear mounted revolubly thereon and held in position by said shoulder, and having a clutch-faced hub, an adjacent driven gear having an engaging clutch-faced hub, and means for shifting said gears in and out of engagement.

In testimony whereof I affix my signature in presence of two witnesses.

DANIEL H. MARVIN.

Witnesses:
VERNAL J. SIES,
R. D. BROWN.